US012810269B2

(12) United States Patent
Raiskin et al.

(10) Patent No.: US 12,810,269 B2
(45) Date of Patent: Nov. 24, 2026

(54) MEDIUM, SYSTEM AND METHOD FOR IDENTIFYING DATA PROCESSING OPERATIONS ON WEBSITES USING NETWORK TRAFFIC LOGS

(71) Applicant: PAYPAL, INC., San Jose, CA (US)

(72) Inventors: Yarden Raiskin, Petaáo-Tiqwa (IL); Yuval Yaron, Tel Aviv (IL)

(73) Assignee: PAYPAL, INC., San Jose, CA (US)

( * ) Notice: Subject to any disclaimer, the term of this patent is extended or adjusted under 35 U.S.C. 154(b) by 447 days.

(21) Appl. No.: 17/985,742

(22) Filed: Nov. 11, 2022

(65) Prior Publication Data

US 2024/0161076 A1 May 16, 2024

(51) Int. Cl.
*G06Q 20/12* (2012.01)
*G06F 16/958* (2019.01)
*H04L 43/0876* (2022.01)

(52) U.S. Cl.
CPC ........... *G06Q 20/12* (2013.01); *G06F 16/986* (2019.01); *H04L 43/0876* (2013.01)

(58) Field of Classification Search
CPC ........... G06Q 30/0641; G06Q 30/0207; G06Q 30/0201; G06Q 20/02; G06Q 20/12; G06Q 30/0239; G06Q 30/0613; G06Q 30/0601–0645; G06F 16/986; H04L 43/0876
USPC ................................................ 705/26.1–27.2
See application file for complete search history.

(56) References Cited

U.S. PATENT DOCUMENTS 11,288,642 B1 * 3/2022 Hawes ................. G06Q 20/102
2021/0064695 A1 * 3/2021 Sharshevsky ........... G06F 40/14
2021/0200955 A1 * 7/2021 Ben Kimon ........... G06N 3/044
2023/0140629 A1 * 5/2023 Rivera ............... G06Q 30/0621 705/26.5

OTHER PUBLICATIONS

Pinja He, Jieming Zhu, Shilin He, Hian Li, and Michael R. Lyu, "Towards AUtomated Log Parsing for Large-Scale Log Data Analysis," IEEE Transactions on Dependable and Secure Computing, 2018, vol. 15, Issue 6, 931-944 (Year: 2017).*

* cited by examiner

*Primary Examiner* — Anna Mae Mitros
(74) *Attorney, Agent, or Firm* — Haynes and Boone, LLP

(57) ABSTRACT

There are provided systems and methods for identifying data processing operations on websites using network traffic logs. A service provider server may provide website and application tools that may track user navigations, inputs and selections, and other operations with merchant websites and/or online merchant marketplaces. Further, the service provider may provide discounts and offers during purchases and transactions with the online merchants, which may further provide reward points or value based on use of the service provider's services. In order to determine available payment options on merchant websites and/or via merchant applications, the service provider may process network traffic logs and other network traffic data. This may include scripts and codes to identify assets for payment service providers. The service provider may utilize an inference mode of a scripted parsing operation to identify these assets and payment options, and record with domains in order to log such availability.

20 Claims, 5 Drawing Sheets

MEDIUM, SYSTEM AND METHOD FOR IDENTIFYING DATA PROCESSING OPERATIONS ON WEBSITES USING NETWORK TRAFFIC LOGS

TECHNICAL FIELD

The present application generally relates to processing of network traffic logs and more particularly to monitoring webpage navigations and/or browser sessions using a browser extension or plug-in for computing operations with transaction processors.

BACKGROUND

An online service provider may provide services to users that may be associated with online shopping and transaction processing. These services may include those associated with finding and providing discounts and other cost savings to be applied to transactions when generated on merchant websites. This may be performed through a web browser extension that monitors, scrapes, and/or extracts data for merchant websites when a user is browsing the website and/or generating a transaction on the merchant website. For example, the web browser extension may monitor websites and data on websites, such as items added to a digital shopping cart, and a total may be calculated based on items, shipping, tax, etc. However, browsing different websites and interfaces for available data requires manual efforts and users may be required to review data and navigate to different merchant and other marketplace platforms. These automated computing tools require specific knowledge of the webpage(s), layouts of the webpage(s) and navigation to such online platforms and data in order to properly provide data to users. Without identifying the same or similar operations on different websites and applications, online service providers may be unable to determine available resources and options on different online platforms. Thus, there is a need for improved and more efficient operations for online service providers to analyze network traffic logs and other available data and determine and map domains to such data.

Figure 1:
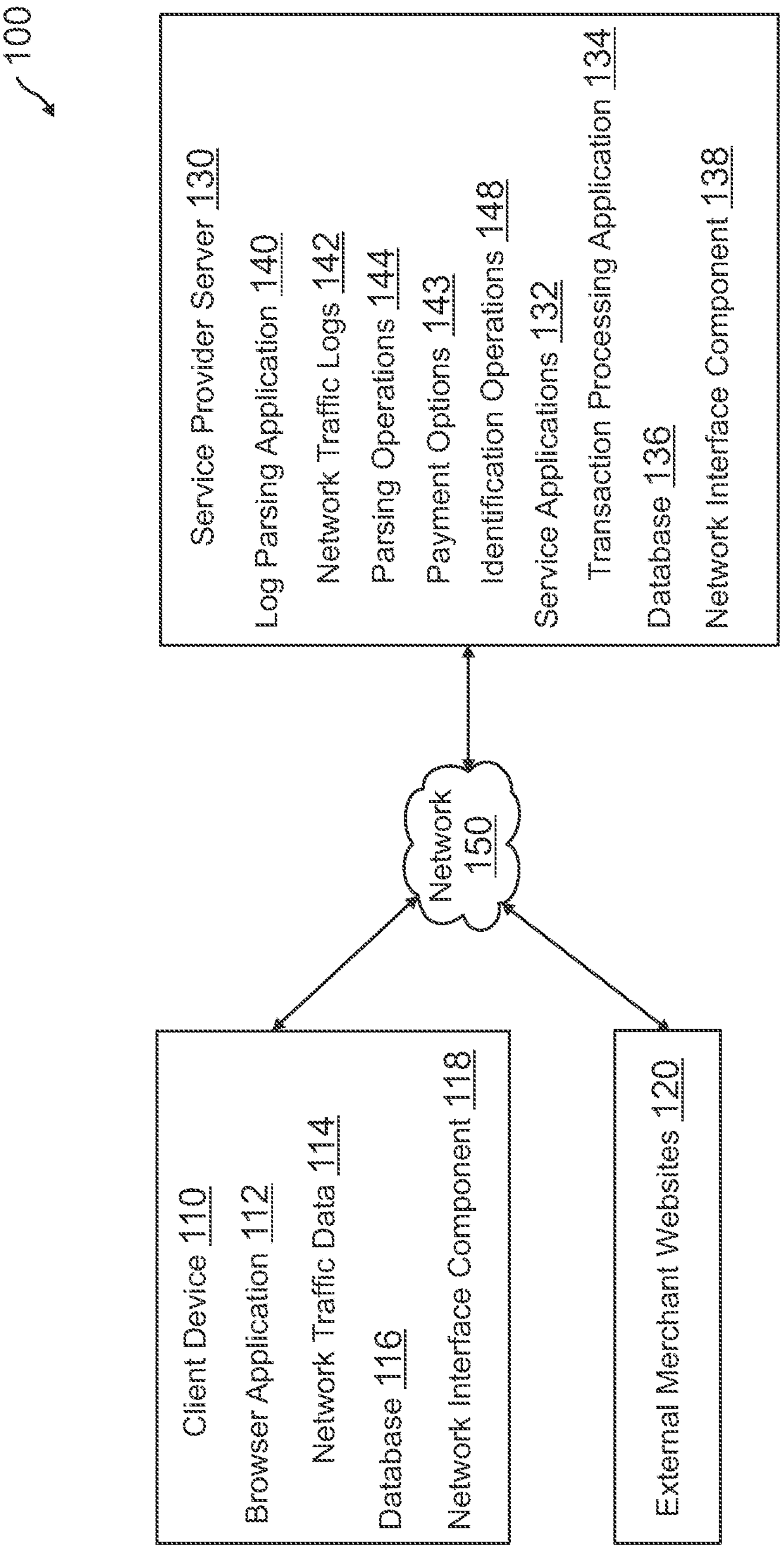
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for browser extensions and applications, such as for identifying data processing operations on websites using network traffic logs. Systems suitable for practicing methods of the present disclosure are also provided.

A service provider, such as HONEY®, may provide services associated with discounts, benefits, loyalty, and other cost savings when checking out and paying for transactions electronically on merchant websites. To provide these services, the service provider may provide a browser tool, add-on, extension, or the like, as well as a resident dedicated application (e.g., mobile application), that may monitor webpage elements on webpages of a merchant website for a merchant. This may allow the service provider to identify items, provide cross-selling and/or comparison shopping, determine and/or enter coupons and other savings, and provide payment processing services to users on computing devices. Other service providers may also provide different services through monitoring and identifying data on websites visited by users, as well as monitoring and tracking available options on websites and via computing applications. However, with the vast array of different website constructions and webpage layouts, data presentations, and the like, service providers may encounter difficulties in correlating and matching items that may be available between different platforms.

In this regard, the operations of the browser or other application extension and/or application may monitor traffic logs of users' navigations and/or inputs when browsing different merchant or other entity websites. These navigations and user inputs may correspond to browsing and/or transaction sessions during online user shopping and/or electronic transaction processing sessions. During these sessions, a transaction may have been initiated (e.g., by viewing an item and/or adding the item for purchase in a digital shopping cart), partially completed and then abandoned (e.g., ending and/or abandoning after initial input of user and/or financial information), and/or completed. For example, transactions may be initiated and/or completed via a checkout page of the merchant or other website, and/or through another application or platform. These checkout pages may include different payment options for different online payment service providers and/or financial institutions. It may be beneficial to identify such payment options and provide additional options, information, and services associated with these payment options.

Such operations may be used to process network traffic logs, as well as query, search, and/or scrape other external merchant platforms, websites, and/or online digital inventories for data identifying payment options that are populated on and/or available through merchant websites. This may be done through collecting network traffic logs, which may be provided via the browser extension, plug-in, software application, and/or links to corresponding data. The service provider may then utilize one or more data processing engines and/or script to extract data from such network traffic logs, which may be used to identify the payment options and/or other tools and operations provided via the checkout webpage and/or merchant website. This may be done by identifying the same or similar HyperText Markup Language (HTML) or Extensible Markup Language (XML) code and/or attribute, JavaScript code, Cascading Style Sheets language, or the like that corresponds to such options and payments on different websites and/or provided by payment providers, such as through applications, insertable options, SDKs, and the like.

Corresponding data may then be extracted and processed to provide a service of the service provider, browser extension, and/or application to the user via the computing device. For example, a user may initiate an online transaction with a merchant website that may require a payment instrument from the user for electronic transaction processing. The user may pay for one or more transactions using a digital wallet or other account with an online service provider or transaction processor (e.g., PAYPAL®, VENMO®, or other affiliates and/or service providers, such as banks, financial institutions, credit card providers, HONEY® or other discount providers, online payment processors, and the like). Further, payment may be provided by proffering a payment card or other financial instrument (e.g., through providing the physical card and reading card data or by entering card details and/or account numbers). An account and/or corresponding payment card for payments by a service provider may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information.

For creating the account, the user may also be required to provide financial information, including payment card (e.g., credit/debit card) information, bank account information, gift card information, benefits/incentives, and/or financial investments, which may be used to process transactions for items and digital gift cards (e.g., exact amount digital gift cards for detected transaction totals). The account creation may also be used to establish account funds and/or values, such as by transferring money into the account and/or establishing a credit limit and corresponding credit value that is available to the account and/or card. The online payment provider may provide digital wallet services, which may offer financial services to send, store, and receive money, process financial instruments, and/or provide transaction histories, including tokenization of digital wallet data for transaction processing. The application or website of the service provider, such as PAYPAL® or other online payment provider, may provide payments and the other transaction processing services.

Thereafter, a service provider may establish coded data packages and operations that identify various fields, forms, data entry or input boxes, and the like on webpages and/or within web or device applications. These may be based on network traffic logs, such as identifications of particular data and/or webpage elements through certain terms, code, and/or webpage element attributes. For example, data for a term may correspond to a term to identify on the different webpages, such as "product", "total", "price", "description", "payment", "pay", payment provider names or logos, payment provider trademarks, as well as combinations of terms and/or sequences, such as "pay here" and the like. Other terms may also be used to identify payment options. Further, weights to terms and webpage element attributes may be identified and used to determine data on different webpages or presentable through different applications, such as an HTML, attribute that is used for searching and presenting data. For example, with HTML, elements, the elements may have an attribute, type, or tag including "id" (e.g., a unique identifier), "class" (e.g., for classifying elements), "style", "title", and the like.

On merchant webpages and the like, there may be fields for a final price, different payment providers, and/or entry of payment information. In this regard, a service provider, such as, HONEY®, may provide a corresponding browser extension and/or application to a computing device that may implement the data packages client-side, locally on a mobile or other computing device, and/or remotely, to monitor, scan, and record data of user interactions and navigations on webpages and/or to webpage links and/or specific application interfaces that may be associated with different merchants. The extension and/or application may detect, collect, and/or request network traffic logs of device interactions, navigations, and/or browsing of merchant websites. Thereafter, the script may be executed to monitor, extract, and/or process network traffic data, logs, and/or webpage elements from the HTML or XML code on the merchant website and/or checkout process. For example, checkout webpages may include HTML, JavaScript, or other language code for listings, links, presented data, images, descriptions, fields, menus, checkout elements, payment options, payment data entry fields, and the like. The data may be extracted from page data for the webpage and processed by the extension or application. The extension, application, plug-in, or the like may provide network traffic logs that include such data, and may be used to identify such payment options. Thereafter, the payment options may be mapped to the corresponding domains.

Using these webpages and detected checkout and payment elements, navigations, browsing data and sessions, and user selections, an inference mode may be executed. The inference mode may be used in order to determine payment options from the webpage's document code and/or data. The extension or application may monitor, track, and record user interactions with different webpages and/or application interfaces from network traffic logs in order to determine such payment options for different online payment providers. For example, the inference mode from the network traffic logs may be used to determine webpage elements that may correspond to fields, data, and the like for digital shopping cart information and/or access, shipping information, billing information, a total, a coupon field, available coupons and coupon information, and the like. A data repository may be utilized in order to track and centralize repository of assets utilized during payment sessions, such as network traffic logs. The logs and/or other data for the assets may be parsed and/or processed for the elements for the corresponding payment options that a user may engage and/or request processing. Once the proper feature, data, or element is identified, data for that feature or other webpage property may be determined and/or extracted in order to monitor payment option assets and similar data. For example, a feature corresponding to payment processor may be tracked between multiple webpages. The webpage code and/or data may be mapped to such webpages, payment assets, and the like in order to identify and track payment options available on different merchant websites, platforms, and/or marketplaces. This may allow for documentation of available data processing operations on different webpages and/or online platforms. Thus, the user's device application and/or application extension may trigger an operation to collect and/or send network traffic logs that may be used in order to map webpages to payment options. Edge devices may further be used to detect payment options and/or update devices with additional payment options.

Thereafter, the data may be provided to the extension and/or application for processing and identification/comparison to the same or similar data with another website or merchant marketplace of a different merchant or may be provided to the service provider for data processing and/or data comparisons and correlations. This may allow the user to view comparisons between different websites and data available on those websites, such as identification and/or comparison of the same, similar, and/or different payment options available on different merchant websites, platforms, and/or checkout processes. This may allow for users to perform electronic transaction processing based on comparison between different payment options and/or electronic payment and transaction processing providers and services. Further, the data may be mapped and aggregated across different domains. Edge computing devices may be used to both collect network traffic logs, as well as provide the inference data from the inference mode of the network traffic logs in order to identify assets available on service provider and/or merchant webpages.

Thus, the application and/or browser add-on, extension, or plug-in may collect data and/or network traffic logs via such computing operations on one or more computing devices, such as a personal computer, tablet computer, mobile smart phone, or the like. The user may engage in one or more online or virtual interactions, such as browsing websites and data available with websites of merchants, which may result in navigational data including links and/or interactions that correspond to fetching data from remote servers, systems, and devices. The transaction processor may monitor and/or track the data over a plurality of visited websites, online resources, and/or applications, for example, using the application and/or application plugin, application extension, or application add-on. Such extensions and/or applications may be provided by a digital platform associated with the service provider and/or transaction processor (e.g., HONEY® or another browser add-on). The service provider may detect engagement in a transaction, such as by viewing one or more items for purchase, adding items to purchase into a digital shopping cart, engaging in a purchase and/or shopping cart checkout, and/or completing a transaction where an item is requested for purchase. This may then be used in order to identify the payment options available from different websites and online platforms.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways, and that the operations performed, and/or the services provided by such devices and/or servers, may be combined or separated for a given embodiment and may be performed by a greater number or fewer number of devices and/or servers. One or more devices and/or servers may be operated and/or maintained by the same or different entities.

System 100 includes a client device 110, external merchant websites 120, and a service provider server 130 in communication over a network 150. Client device 110 may be used to browse websites and/or merchant marketplaces via software applications using a platform, application, and/or application extension provided by service provider server 130. During use of client device 110 with external merchant websites 120, client device 110 and/or service provider server 130 may detect when a webpage or other online data is visited that may correspond to a page for interaction by the extension or application (e.g., an item browsing page, a checkout page and/or flow, etc.). Navigation and item transactions may be tracked, as well as other network traffic logs. Thereafter, the network traffic logs and other buttons, code snippets, images, logos, and/or other webpage assets may be analyzed to identify network traffic, code, and/or other data that indicates payment processing and/or payment options available on external merchant websites 120.

Client device 110, external merchant websites 120, and service provider server 130 may each include or be associated with one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Client device 110 may be implemented using any appropriate hardware and software configured for wired and/or wireless communication with external merchant websites 120, service provider server 130, and/or another device or server for browsing websites and identifying website features, data, and/or elements. Client device 110 may correspond to or be associated with an individual user, consumer, or merchant that utilizes client device 110. In various embodiments, client device 110 may be implemented as a personal computer (PC), a smart phone, laptop/tablet computer, wristwatch with appropriate computer hardware resources, other type of wearable computing device, and/or other types of computing devices capable of transmitting and/or receiving data. Although only one computing device is shown, a plurality of computing device may function similarly.

Client device 110 of FIG. 1 contains a browser application 112, a database 116, and a network interface component 118. Browser application 112 may correspond to executable processes, procedures, and/or applications with associated hardware. In other embodiments, client device 110 may include additional or different software as required.

Browser application 112 may correspond to one or more processes to execute modules and associated devices of client device 110 to provide a convenient interface to permit a user for client device 110 to access and browse external merchant websites 120 and/or engage in electronic transaction processing with external merchant websites 120. In this regard, browser application 112 may correspond to specialized hardware and/or software utilized by client device 110 that may provide for website and item browsing from external merchant websites 120, as well as transaction processing for the items. Viewing, browsing, and interacting with external merchant websites 120 may be done through one or more user interfaces of browser application 112 enabling the user to access external merchant websites 120 and enter and/or view the items that the user associated with client device 110 wishes to purchase. This may be based on a transaction generated by browser application 112 using a merchant website provided by external merchant websites 120. Browser application 112 may also be used by a user to provide payments and transfers to a second user or merchant. For example, browser application 112 may utilize user financial information, such as credit card data, bank account data, or other funding source data, as a payment instrument when providing payment information. Additionally, browser application 112 may utilize a digital wallet associated with an account with service provider server 130 as the payment instrument, for example, through accessing a digital wallet or account of a user through entry of authentication credentials and/or by providing a data token that allows for processing using the account. Browser application 112 may also be used to receive a receipt or other information based on transaction processing.

In various embodiments, browser application 112 may correspond to a web browser application and/or web browser extension (with a general web browser application) configured to retrieve, present, and communicate information over the Internet (e.g., utilize resources on the World Wide Web) or a private network. For example, browser application 112 may provide a web browser and/or extension, which may send and receive information over network 150, including retrieving website information, presenting the website information to the user, and/or communicating information to the website, including payment information for the transaction. Browser application 112 may correspond to a mobile web browser application. In this regard, browser application 112 may include a browser extension, add-on, or plug-in that may be provided by service provider server 130, such as one provided by HONEY®. However, in other embodiments, browser application 112 may include a dedicated application of service provider server 130 or other entity (e.g., a merchant), which may be configured to provide the services discussed herein with external merchant websites 120. Browser application 112 may include operations to parse, monitor, and track webpage data on a merchant website in order to determine payment options on such a webpage, such as based on network traffic logs and/or other network traffic data. The tracked and/or monitored data, as well as collected data logs, may be transmitted to service provider server 130 for analysis and processing. Further, browser application 112 may be used to add or insert savings to a transaction, for example, by entering a savings alphanumeric code, bar or QR code, text, data, or the like to a webpage field and/or option that causes the savings to be applied to and reduce a cost of a transaction.

In this regard, browser application 112 may be used to monitor website navigations and/or electronic transaction processing on websites. Browser application 112 may monitor and track HTML, XML, JavaScript, or other code for one or more webpages of external merchant websites 120, as well as other interface data and the like for electronic transaction processing options, operations, logos, and processors, and generate network traffic data 114. Network traffic data 114 may be used for identification of webpage features, data on webpages, and/or individual or groups of webpage elements when parsing and/or processing the webpage elements or code and the like for the monitored, tracked, and/or recorded webpage and electronic transaction processing. Service provider server 130 may receive the data from browser application 112 and may utilize the data for determining payment processing options and services provided via external merchant websites 120.

Client device 110 may further include database 116, which may include, for example, identifiers such as operating system registry entries, cookies associated with browser application 112 and/or other applications, identifiers associated with hardware of client device 110, or other appropriate identifiers. Identifiers in the database may be used by a payment/service provider to associate client device 110 with a particular account maintained by the payment/service provider. The database may also further store monitored navigation and/or electronic transaction processing data, including network traffic data 114 and/or other network traffic logs or the like from external merchant websites 120.

Client device 110 includes at least one network interface component 118 adapted to communicate with service provider server 130, external merchant websites 120, and/or another device or server over network 150. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

External merchant websites 120 may correspond to one or more online websites, digital marketplace platforms, web applications, application stores for local device software application, and associated resources to provide features, services, and other operations for a merchant, seller, or the like to advertise, market, sell, and/or provide items for sale, as well as provide checkout and payment via different payment options. In this regard, external merchant websites 120 may be utilized by one or more merchants to provide websites and/or online portals for transaction processing and sales. For example, external merchant websites 120 may be used to host a website having one or more webpages that may be used by customers to browse items for sale and generate a transaction for one or more items. External merchant websites 120 may provide a checkout process, which may be utilized to pay for a transaction. In some embodiments, the checkout process may be provided by service provider server 130 based on one or more operations, software development kits (SDKs), application programming interface (API) standards or guidelines, and the like that may be implemented in each merchant website from one or more online transaction processors and/or payment provider platforms. The checkout process may be used to pay for a transaction using a payment instrument, including a credit/debit card, and account with service provider server 130, or the like.

External merchant websites 120 may be utilized by customers and other end users to view one or more user interfaces, for example, via graphical user interfaces (GUIs) presented using an output display device of client device 110. These user interfaces may be used to navigate through items for sale on the merchant website, generate a transaction, and checkout for the transaction on the merchant website. Further, external merchant websites 120 may be processed and/or parsed to scrape and/or extract data (e.g., HTML/XML code and/or elements from CSS/HTML/XML documents for webpages) when viewing items, engaging in electronic transaction processing, or otherwise interacting with external merchant websites 120. Thus, client device 110 may identify different features of webpages, interfaces, and/or online merchant marketplaces for external merchant websites 120, such as when browsing items and engaging in transaction processing in browser application 112 on client device 110.

External merchant websites 120 may provide features, services, and other operations for sales and checkout purchases through sales applications. In this regard, sales applications utilized by external merchant websites 120 may provide websites and/or online portals for transaction processing and sales. For example, external merchant websites 120 may host a website having one or more webpages that may be used to browse items for sale and generate a transaction for one or more items, which may be processed using one or more payment processes, payment instruments, and/or payment service providers. Sales applications may provide a checkout process, which may be utilized to pay for a transaction via one or more of the available payment processing options, forms, and/or operations from one or more online transaction processors. The checkout process may be used to pay for a transaction using a payment instrument, including a credit/debit card, and account with service provider server 130, or the like.

External merchant websites 120 may be utilized by a user and/or merchant to view one or more user interfaces (UIs), for example, via graphical UIs (GUIs) presented using an output display device of client device 110. Thus, these UIs may be used to navigate through items for sale on the merchant website, generate a transaction, and checkout for the transaction on the merchant website. In order to provide data and features for external merchant websites 120, external webpages, marketplace platforms, and/or other online merchant data for item sales, sales applications may include HTML, or XML code, JavaScript code and/or operations, code snippets, database records and/or information, and the like for different webpages and/or online merchant marketplaces. This data may be utilized by client device 110 and network traffic logs may be generated that identify payment processes and/or payment providers provided via external merchant websites 120.

Service provider server 130 may be maintained, for example, by an online service provider, which may provide operations for monitoring website browsing and providing services and data to users on webpages and/or for item transaction processing. Various embodiments of the navigation processing system described herein may be provided by service provider server 130 and may be accessible by client device 110 when accessing one or more of external merchant websites 120. In such embodiments, service provider server 130 may interface with client device 110 to determine payment options available on external merchant websites 120. Service provider server 130 includes one or more processing applications which may be configured to interact with client device 110 and external merchant websites 120. In one example, service provider server 130 may be provided by PAYPAL® and/or HONEY®. However, in other embodiments, service provider server 130 may be maintained by or include another type of service provider.

Service provider server 130 of FIG. 1 includes a log parsing application 140, service applications 132, a database 136, and a network interface component 138. Log parsing application 140 and service applications 132 may correspond to executable processes, procedures, and/or applications with associated hardware. In other embodiments, service provider server 130 may include additional or different modules having specialized hardware and/or software as required.

Log parsing application 140 may correspond to one or more processes to execute modules and associated specialized hardware of service provider server 130 to monitor and track user navigations and transaction processing to determine whether certain payment options and/or payment processing services are available on external merchant websites 120. In this regard, log parsing application 140 may correspond to specialized hardware and/or software used by a user associated with client device 110 to monitor, obtain, and/or track network traffic logs 142, which may be obtained from installed applications, browser extensions, plug-ins, or the like that may provide navigation data to service provider server 130. For example, browser plug-ins may allow for systematic determination of webpage and/or interface features, data, and/or elements that may be associated with electronic transaction processing from network traffic logs 142 using parsing operations 144 that parse data from network traffic logs 142. This may be based on webpage, application, and/or interface code, such as elements, descriptions, and other data for items, digital shopping carts, and/or electronic transactions. For example, an HTML, XML, JavaScript, or the like document or network traffic log for a webpage may include webpage elements, where the code for the document may be extracted and parsed using parsing operations 144. This allows for determination of webpage features, data, or one or more specific elements to determine if a page contains certain item data, which may be identified and extracted by parsing operations 144 for identification of payment options 146 during an inference mode of log parsing application 140. The inference mode may be performed based on a repository of data logs and identification by parsing operations 144 of "assets" or other executed scripts, buttons, code snippets, images, logos, and the like of payment service providers and payment processing operations for payment options 146.

During monitoring and parsing of network traffic logs 142 by log parsing application 140, payment options 143 may be determined by parsing operations 144. This may include mapping and/or linking payment options 143 to different ones of external merchant websites 120, where identification operations 148 may be used for such mappings. In this regard, when a user browses items, engages in electronic transaction processing, and/or results in network traffic logs 142 having data for payment options 143, parsing operations 144 may provide data for identification operation 148. For example, network traffic logs 142 may be captured, such as during navigations and/or page loading including those pages associated with payments and/or checkouts. Network traffic logs 142 may therefore include a catalog of web domains and assets on the corresponding domains based on the corresponding code or other data for web developers and/or webpage coding. Parsing operation 144 may then iterate over entries for a domain, websites, checkout webpage(s) or the like for one or more of external merchant websites 120, and assets for payment options 143 may be identified with an entry in a corpus and marked for the corresponding payment option and/or payment service provider. Identification operations 148 may then report all identified payment options on a payment page. Thereafter, optional identification of specific assets, payment service providers, and/or the like may be categorized and provided with identifiers, such as "checkout now", expedited payment, credit options, and the like with payment options 143 by identification operations 148.

Service applications 132 may correspond to one or more processes to execute modules and associated specialized hardware of service provider server 130 to process a transaction or provide another service to customers, merchants, and/or other end users and entities of service provider server 130. In some embodiments, service applications 132 may be used by a user associated with client device 110 to establish a user and/or payment account, as well as a digital wallet, which may be used to process transactions. For example, an account provided by HONEY® may be provided for item comparison, discount services, and/or canceled transaction suggestions. However, a more general account (e.g., a PAYPAL® account) may also provide the account services and be utilized for service applications 132. In various embodiments, financial information may be stored with the account, such as account/card numbers and information that may enable payments, transfers, withdrawals, and/or deposits of funds. A digital token for the account/wallet may be used to send and process payments, for example, through an interface provided by service provider server 130. The account may also be used to receive and/or utilize rewards, loyalty points, coupons, incentives, discounts, and the like with one or more of external merchant websites 120.

In this regard, log parsing application 140 and/or service applications 132 may provide savings and coupon services via browser application 112, for example, by providing item comparison shopping, coupons and savings, and the like while browsing and/or purchasing items on external merchant websites 120. Browser application 112 (e.g., generated and/or provided by log parsing application 140) may be used when identifying, determining, and/or extracting features, data, and/or elements on multiple webpages in order to determine applicable coupons, discounts, or the like, which may be utilized for the savings and coupon services during electronic transaction processing. The account may be accessed and/or used through a web browser application/extension and/or dedicated software application executed by client device 110 and engage in computing services provided by service applications 132. Service applications 132 may also include or utilize different processors, engines, or models as required for an authentication, account setup and maintenance, electronic transaction processing, deposit and/or withdrawal, and the like, for example, through one or more platforms that may be integrated through different API integrations to allow APIs of the platforms, services, and applications to exchange data. Service applications 132 may include one or more APIs that perform API calls and requests, and receive responses, to provide services for canceled transaction suggestions and discount or savings services.

In various embodiments, service applications 132 may be used when navigating to and/or between webpages, applications and/or application interfaces, computing services, digital resources, and the like for electronic transaction processing, which may be monitored by log parsing application 140 to generate network traffic logs 142. For example, service applications 132 may be used with accessed webpages to provide one or more services and/or determine payment options 143 based on parsing operations 144 with network traffic logs 142. Thus, service applications 132 may provide services associated with websites and webpages via browser application 112, which may correspond to one or more external merchant websites 120 and associated resources to provide features, services, and other operations for a user, purchaser, merchant, seller, or the like based on payment options 143 and identification operation 148. In this regard, the webpages and/or online digital platforms of various external merchant websites 120 may be utilized by one or more merchants to provide transaction processing and sales. For example, service applications 132 and/or log parsing application 140 may interface with client device 110 while browsing the webpages of external merchant websites 120 and provide discount and savings services via browser application 112.

Service applications 132 may further be utilized by customers and other end users to view one or more user interfaces (UIs), for example, via graphical UIs (GUIs) presented using an output display device of client device 110. These UIs may be used with browser application 112 and/or external merchant websites 120 to navigate through items for sale on the merchant website, generate a transaction, receive savings and other discounts or coupons, and checkout for the transaction on the merchant website, as well as provide additional links and/or data for canceled transaction suggestions when one or more of canceled transaction 124 are detected. Service applications 132 may process the payment and may provide a transaction history to client device 110 for transaction authorization, approval, or denial. In other embodiments, service applications 132 may further provide different computing services, including social networking, microblogging, media sharing, messaging, business and consumer platforms, etc.

Service applications 132 may provide additional features to service provider server 130. For example, service applications 132 may include security applications for implementing server-side security features, programmatic client applications for interfacing with appropriate application programming interfaces (APIs) over network 150, or other types of applications. Service applications 132 may contain software programs, executable by a processor, including one or more GUIs and the like, configured to provide an interface to the user when accessing service provider server 130, where the user or other users may interact with the GUI to view and communicate information more easily. In various embodiments, service applications 132 may include additional connection and/or communication applications, which may be utilized to communicate information to over network 150.

Additionally, service provider server 130 includes database 136. Database 136 may store various identifiers associated with client device 110. Database 136 may also store account data, including payment instruments and authentication credentials, as well as transaction processing histories and data for processed transactions. Database 136 may store network traffic logs 142, as well as payment options 143 that may be mapped to one or more domains for external merchant websites 120.

In various embodiments, service provider server 130 includes at least one network interface component 138 adapted to communicate with client device 110, external merchant websites 120, and/or another device/server for a merchant over network 150. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2:
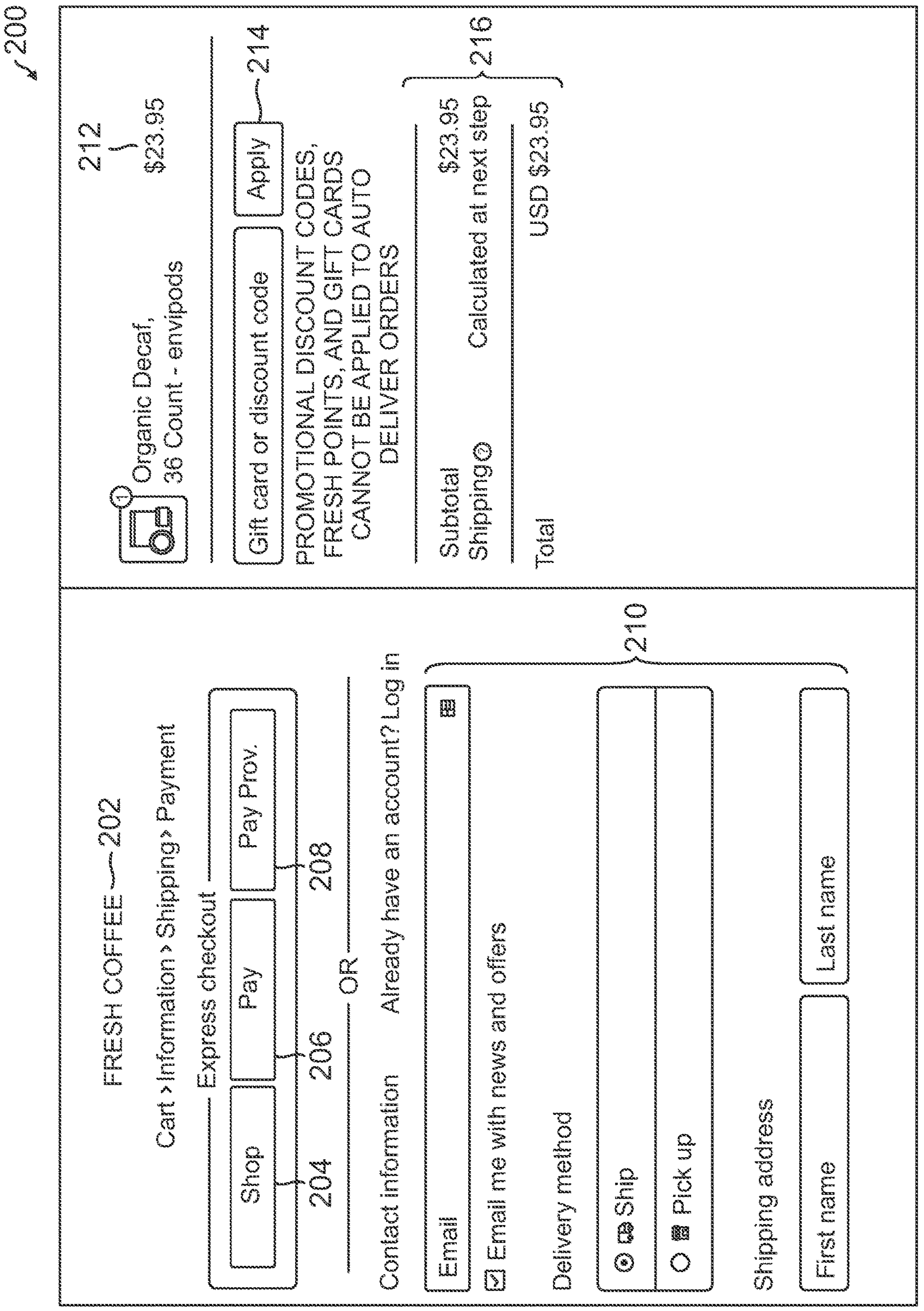
FIG. 2 is an exemplary user interface that may be processed in order to determine available payment processing options through the user interface, according to an embodiment.

FIG. 2 is an exemplary user interface 200 that may be processed in order to determine available payment processing options through the user interface, according to an embodiment. User interface 200 of FIG. 2 includes information that may be parsed from one or more network traffic logs and other network data during a browsing session of a merchant website in order to determine payment options available via the merchant website, such as by log parsing application 140 of service provider server 130 in system 100 of FIG. 1.

In user interface 200, a service provider, such as one associated with service provider server 130, may collect network logs, traffic, and/or other data for a purchase or other browsing session by a customer, which is collected for the purposes of determining whether user interface 200 includes any payment options for different payment service providers. For example, a user may utilize a computing device, such as client device 110, to navigate to merchant website 202 for a coffee checkout. This may cause generation of network traffic data, such as logs, communications, JavaScript interactions and code from processed navigations and browsing sessions, and the like. Thereafter, such data may be parsed and processed in order to determine payment options 204, 206, and 208, as well as a payment field 210. Further, user interface 200 may include information that may be parsed, processed, and/or filtered during an inference mode to process network traffic data from an item field 212, a discount field 214, and/or a transaction data field 216.

For example, network traffic may be captured when loading a merchant's payment page corresponding to merchant website 202. One or more data processing operations for a service provider, such as log parsing application 140 of service provider server 130, may be executed in order to analyze the logs and other network traffic data to identify network traffic related to known payment providers, payment processing platforms, and/or payment options. This may be done by identify respective assets (images, web links, JavaScript, code snippets, logos, text, etc.) for payment options 204, 206, and/or 208. In this regard, a payment provider's website, which may be separate from the merchant website 202, may provide a link and/or option to access the payment provider website, where the website may have assets that can be identified from the network traffic generated when the user's device accesses merchant website 202. Thus, network traffic to external web domains may occur and be detected from the network traffic logs. This may utilize a data stream for network traffic logs to identify such options available on merchant websites. The data may be captured and directly categorized from existing documentation and domains with less data processing requirements and resource usage.

Thus, the processing of data from merchant website 202 when accessed by a computing device may not solely rely on the HTML, code. Instead, network communication that include data for a payment provider's integration in merchant website 202 for payment options 204, 206, and 208, as well as payment field 210 may be captured from the network traffic logs. This may not require HTML, processing capabilities by utilizing website network traffic from a catalog or data repository that may be captured from computing devices via one or more browser extensions and/or software applications.

Figure 3:
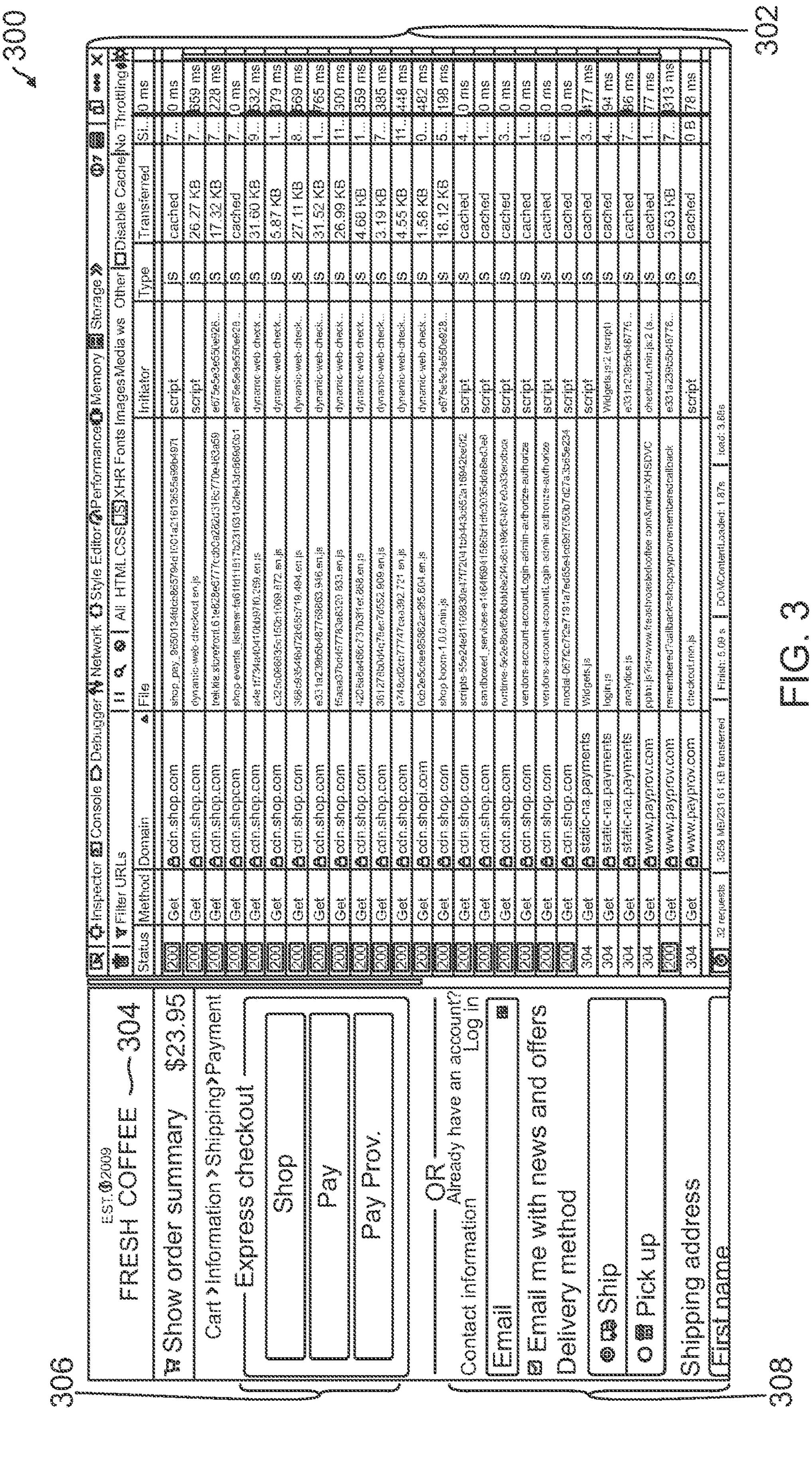
FIG. 3 is an exemplary diagram of a network traffic log that may be processed in order to determine payment processing options available on websites and/or through application interfaces, according to an embodiment.

FIG. 3 is an exemplary diagram 300 of a network traffic log that may be processed in order to determine payment processing options available on websites and/or through application interfaces, according to an embodiment. Diagram 300 shows interactions between client device 110 and service provider server 130, discussed in reference to system 100 of FIG. 1, which may further interact with one or more merchant websites and/or applications for generation of a network traffic log 302. In this regard, client device 110 may be used to generate, monitor, and/or track network traffic log 302 from a browsing session via a browser extension, software application, script, or the like, which may then be processed by service provider server 130 for identification on merchant website 304 of payment options 306, payment field 308, and/or other information for payment service providers. Such operations may be run in real-time or near real-time in a layout agnostic manner by an application on a computing device, such as browser application 112 on client device 110 in system 100 of FIG. 1.

Initially, a user's computing device may be used to browse a merchant website 304, which may result in generation and tracking of data for network traffic log 302 that includes different files having types from initiators (e.g., scripts, extensions, listeners, streamers, and the like) that are linked to domains for merchants, online electronic transaction processors, and the like. A content delivery network ("CDN") may correspond to a geographically distributed network of proxy servers and data centers that provide high availability and performance by distributing the CDN service spatially relative to end users. This may include different delivery of services, such as video streaming, data aggregation and streaming, analytics, cloud operations, and the like, which may also host operations e-commerce and payment options. For example, CDNs may be used to host assets such as payment processing code, payment-related graphics (e.g., logos, icons such as checkout buttons, etc.). Such data may be recorded, tracked, and/or processed from network traffic log 302. Network traffic log 302 and similar logs may contain entries for each network session, such as at least until an end and optionally from a start of the session or a point at which recordation is requested or initiated. A network session may contain multiple messages sent and received by two communicating endpoints. Analyzing network traffic logs may provide insights regarding the activity of the website and corresponding communicating servers and devices. While loading merchant webpage 304, the browser at an endpoint may communicate with different CDNs in order to request assets and load such assets on a user's computing device.

Further, domains may include top-level domains in the domain name hierarchy and second-level domain (SLID) names. SLDs may be the names associated with .com, .net, and the other top-level domains. As an example, in the domain example.co.uk, co is the second-level domain. Second-level (or lower-level, depending on the established parent hierarchy) domain names are often created based on the name of a company, product, or service. A browser extension may be provided on a computing device and may correspond to a software module for customizing a web browser. Browsers typically allow a variety of extensions, including user interface modifications, cookie management, ad blocking, and the custom scripting and styling of web pages In this regard, by processing network traffic log 302 for merchant webpage 304 to identify payment options 306 and/or payment field 308, the operations of a service provide may identify executed JavaScript scripts, buttons and code snippets, images and logos, and other assets. Distributed data for network traffic logs may be tracked and stored by a capturing system utilizing software and/or extension on edge devices, such as browser extensions and edge computing devices/networks. Thereafter, repositories or other data storage and processing centers may process the received information to find subsets of assets in purchase sessions, and their frequencies of occurrence for different domains. In this regard, assets of note for payment options may be the longest and most frequent subsets of assets that represent a "hit", or identification/identifier, associated with a payment option and/or available payment provider corresponding to payment options 306 and/or payment field 308, such as one or a combination of assets required to execute a transaction. Thus, at inference time, the browser extension and/or software application may send asset information for each page to the repositories, receive a response of a hit or miss, and based on the statistical knowledge, have such data curated in each repository.

Thus, a data stream for network traffic log 302 and other network traffic logs may be used to identify assets on different websites. This may therefore allow for data acquisition to be performed in a distributed manner over user's edge computing devices and networks, where asset identification and statistical correlations are performed over repositories. For example, an edge computing system may correspond to an auxiliary cloud computing system that may provide one or more edge computing nodes that are location-specific and provided on a network closer to the location so that data may be served faster and with lower latency to computing devices associated with the location. Edge computing may correspond to locating applications and data, including a general or specific-purpose compute, storage, and other operations to utilize those components, closer to end users on a network and/or using Internet of Things (IoT) endpoints. This allows for better application performance and faster provision of data from an edge storage node, thereby enhancing and improving experiences and quality of network usage for the applications and data.

This may also improve efficiency and speed in delivering content to users. In one embodiment, an edge computing node may be provided by a cellular network (e.g., 5G, however, other cellular networks may also be utilized). Edge computing systems and nodes may also be provided by cloud computing systems, such as Amazon AWS®, Microsoft Azure®, and the like. Additionally, edge storage nodes discussed herein may be location-specific and may retain data that is not shared with a cloud computing system. This further may not require machine learning model training in order to be performed more quickly, however, machine learning and neural network models may be trained for further analysis of network traffic logs and identification of assets based on loaded data to computing devices, which may be utilized by edge computing devices, systems, nodes, and/or storages.

For determination and tracking of network traffic log 302 and/or identification of payment options 306 and/or payment field 308, a data acquisition mode may be executed in a distributed manner over user's edge devices, servers, and/or networks. When navigating to a merchant website or other online platform, a transaction event may be detected and at a browsing session's end (session end can be detected by closing the tab, navigation out of the SLD, a timeout, or the like), corresponding assets that were utilized during the session may be provided to the repository. Thereafter, the repository may determine available assets, sequences of assets, and/or frequency of such assets. A threshold (e.g., which may be defined either manually, by a machine learning model, such as an unsupervised one-dimensional regression tree or the like, or other operation) may be used to determine whether an occurrence of an asset is sufficient for recordation and identification on merchant website 304 based on network traffic log 302 and/or other network traffic logs.

Thereafter, data for payment options 306 and/or payment field 308 may be identified and/or populated on one or more additional client and/or computing devices. For example, the logs and/or user information may be used to identify the payment options on different webpages and/or through different merchant platforms in order to identify and highlight such options. This may be based on a correlation to available payment options to users. Further, the identifications and/or highlighting of such options may be based on and/or provided for different benefits or discounts that may be utilized by the users based on the users' information and/or available financial instruments and enrolled payment providers.

Figure 4:
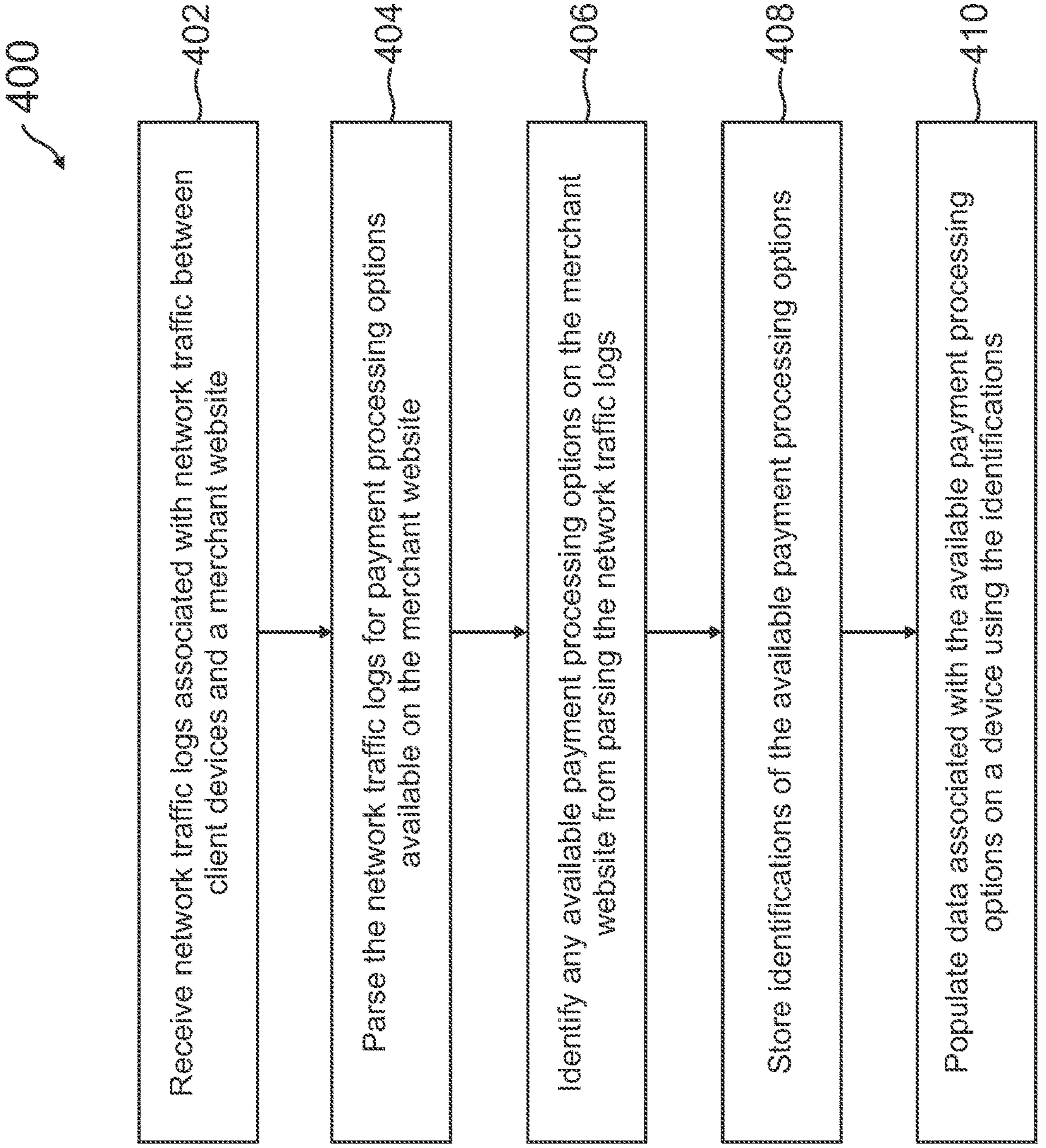
FIG. 4 is a flowchart for identifying data processing operations on websites using network traffic logs, according to an embodiment.

FIG. 4 is a flowchart 400 for identifying data processing operations on websites using network traffic logs, according to an embodiment. Note that one or more steps, processes, and methods described herein of flowchart 400 may be omitted, performed in a different sequence, or combined as desired or appropriate.

At step 402 of flowchart 400, network traffic logs associated with network traffic between client devices and a merchant website are received. These may be received via a browser extension and/or other computing device application or software operation. The network traffic logs may be collected by one or more computing devices and may then be provided to a network traffic repository and/or data storage and processing center. This may be done utilizing a data streamer or the like for events from different computing devices.

At step 404, the network traffic logs are parsed for payment processing options available on the merchant website. Parsing may be performed by one or more operations and/or data scripts that identify assets or other data from the network traffic logs that correspond to different payment service providers and/or operations or data associated with such providers. This may be done based on the data stored by the repositories and performed by the computing device and/or operations of the data storage repositories.

At step 406, any available payment processing options on the merchant website are identified from parsing the network traffic logs. This may be done by determining that one or more assets on the merchant website meets or exceeds a threshold occurrence and/or rate on the merchant website and/or other merchant websites based on the network traffic logs. The payment processing options may be identified based on different data, network communications, or the like. At step 408, identifications of the available payment processing options are stored. The identifications may correspond to identifiers used to correlate the payment processing options to domains and/or webpage elements on those domains. Thereafter, at step 410, data associated with the available payment processing options are populated on a device using the identifications. This may include identifying payment options, discounts, and the like associated with such option. Further, comparisons and/or matching between those options may be provided on user computing devices, such as to show available credit, discounts, benefits, and/or the like between the different options.

Figure 5:
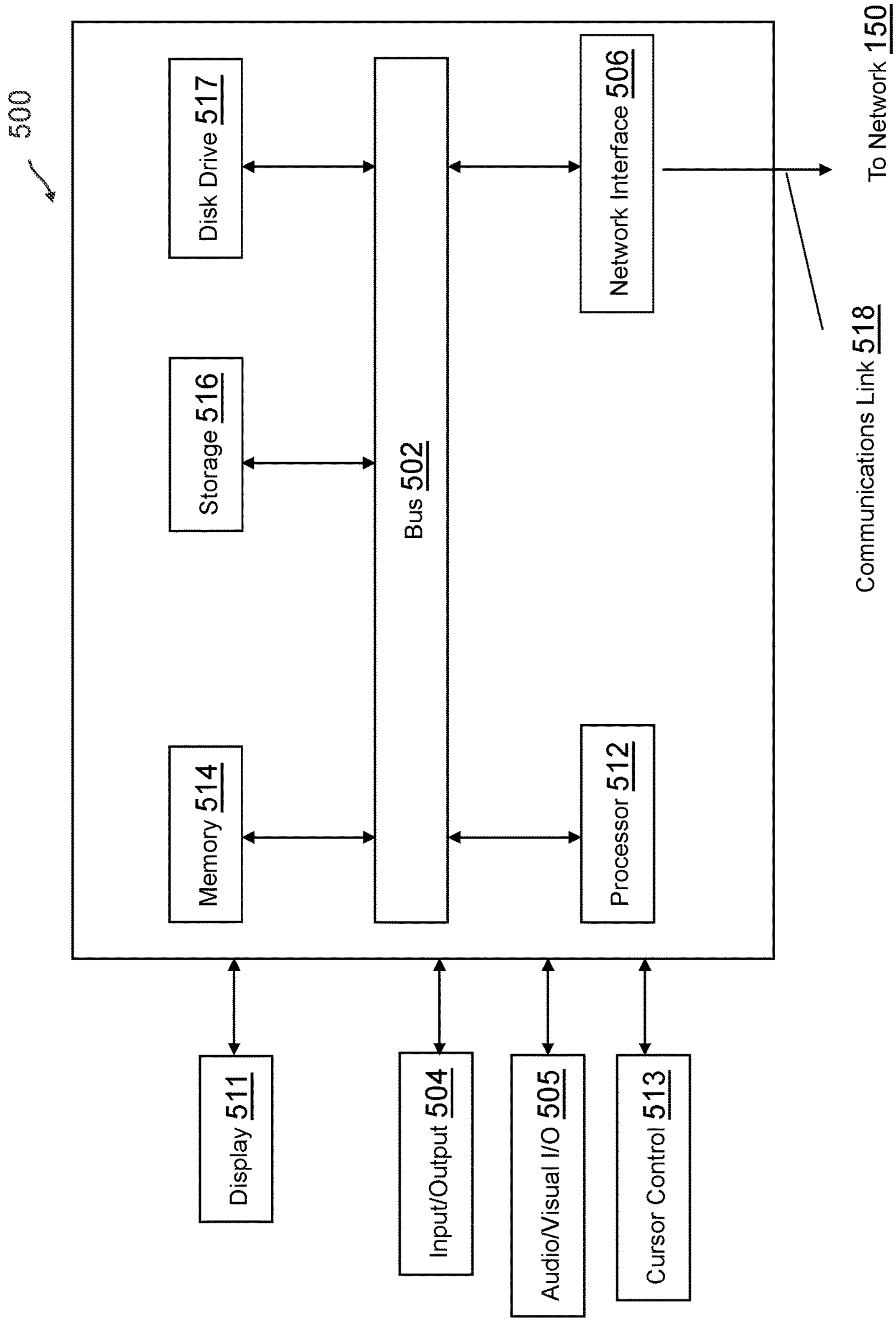
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, images, or links, and/or moving one or more images, etc., and sends a corresponding signal to bus 502. I/O component 504 may also include an output component, such as a display 511 and a cursor control 513 (such as a keyboard, keypad, mouse, etc.). An optional audio/visual input/output (I/O) component 505 may also be included to allow a user to use voice for inputting information by converting audio signals and/or input or record images/videos by capturing visual data of scenes having objects. Audio/visual I/O component 505 may allow the user to hear audio and view images/video including projections of such images/video. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A non-transitory machine-readable medium having stored thereon machine-readable instructions executable to cause a machine to perform operations comprising:

accessing, from a network log repository, a plurality of network traffic logs tracked over a period of time, wherein the plurality of network traffic logs are associated with a plurality of entity websites;

determining a set of supported payment providers associated with the plurality of entity websites;

parsing webpage code from the plurality of network traffic logs for webpage assets associated with the plurality of entity websites, wherein the webpage assets are associated with transaction events during network sessions between one or more of the plurality of entity websites and a first payment provider of the set of supported payment providers;

identifying a portion of the webpage code for a first one of the webpage assets corresponding to a payment processing operation for the first payment provider on the one or more of the plurality of entity websites based on one or more of the webpage assets used for the transaction events;

determining that one or more occurrences of the first one of the webpage assets in the webpage code of the one or more of the plurality of entity websites meets or exceeds a threshold occurrence;

cataloging the first one of the webpage assets in association with the payment processing operation with the first payment provider, wherein the first one of the webpage assets occurring on an additional website identifies that the additional website supports the payment processing operation;

detecting a navigation to the additional website by a device using a browser extension on the device;

scanning, in real-time when the navigation is detected, a network traffic log between the device and the additional website using the browser extension;

detecting an additional occurrence of the first one of the webpage assets based on the network traffic log scanned, wherein the detecting includes identifying the portion of the webpage code on the additional website when scanning the network traffic log;

identifying that the payment processing operation appears on the additional website based on the additional occurrence detected;

comparing a first usage of the payment processing operation on one of the plurality of entity websites previously visited by the device with a second usage of the payment processing option on the additional website, wherein the comparing is based on one of a discount or a benefit provided by a payment instrument for each of the first usage and the second usage;

displaying, in real-time via the device using the browser extension based on the navigation, a result of the comparing and an option associated with using the payment instrument via the payment processing operation for a transaction on the additional website; and populating a field on the additional website with information associated with the one of the discount or the benefit.

2. The non-transitory machine-readable medium of claim 1, wherein the payment processing operation is associated with one of a plurality of online payment processing options provided by the first payment provider.

3. The non-transitory machine-readable medium of claim 1, wherein the operations further comprise:

reporting the cataloging in a data repository associated with the web browser extension.

4. The non-transitory machine-readable medium of claim 3, wherein the operations further comprise:

identifying, based on the reporting, the payment processing operation on at least one of the plurality of entities websites via the web browser extension.

5. A system comprising:

a non-transitory memory; and one or more hardware processors coupled to the non-transitory memory and configured to read instructions from the non-transitory memory to cause the system to perform operations comprising:

receiving, from a computing application on a first client device, a first network log of network transmissions between the first client device and a transaction processor associated with the system;

parsing first webpage code from the first network log for webpage assets for a transaction event processed by the transaction processor based on a request from the first client device;

identifying that a first asset from the webpage assets is associated with a transaction processing option for the transaction processor based on one or more of the webpage assets used for the transaction event, wherein the first asset corresponds to a portion of the first webpage code;

determining that one or more usages of the first asset in the first webpage code meets or exceeds a threshold usage;

determining that a website in association with the first network log includes the transaction processing option based on the parsing and the identifying;

cataloging the first asset with a website domain of the website;

detecting a navigation to an additional website by a device using the computing application, wherein the first asset on the additional website identifies that the additional website supports the transaction processing option;

scanning a second network log between the device and the additional website using the computing application;

detecting the first asset based on the second network log scanned, wherein the detecting includes identifying the portion of the webpage code on the additional website when scanning the second network log;

identifying that the transaction processing option appears on the additional website based on the detecting;

comparing a first usage of the transaction processing operation for one or more items on the website with a second usage of the transaction processing option for the one or more items on the additional website, wherein the comparing is based on a payment instrument usable by the device for the first usage and the second usage of the transaction processing operation;

displaying, in real-time via the computing application based on the navigation, a result of the comparing and an option associated with using the payment instrument via the transaction processing option for a transaction on the additional website; and populating a field on the additional website with information associated with the payment instrument via the computing application.

6. The system of claim 5, wherein the operations further comprise:

receiving a third network log associated with the first asset, wherein the identifying that the first asset is associated with the transaction processing option is based on the third network log.

7. The system of claim 6, wherein the operations further comprise:

parsing webpage code of the third network log for the first asset and at least one second asset; and identifying the first asset from the at least one second asset based on the webpage code of the third network log, wherein the cataloging is based on the first asset identified from the at least one second asset.

8. The system of claim 5, wherein the identifying that the transaction processing option appears on the second website uses a browser extension associated with the computing application and is based on the website domain.

9. The system of claim 8, wherein the operations further comprise:

populating, via the browser extension in the computing application, at least one discount available utilizing the first asset for the transaction processing option on the additional website.

10. The system of claim 9, wherein the operations further comprise:

causing to be displayed, via the browser extension in the computing application, an alternative transaction processing option associated with the transaction processor with the first asset.

11. The system of claim 5, wherein the operations further comprise:

reporting a plurality of transaction processing options associated with the website.

12. The system of claim 5, wherein the parsing is iterated over a plurality of second network logs associated with the website domain.

13. The system of claim 5, wherein the operations further comprise:

reporting, with the cataloging to the transaction processor, at least one of a type or a provider of the transaction processing option available on the additional website.

14. A method comprising:

capturing, by a transaction processor, a plurality of network traffic logs by a plurality of computing systems and a plurality of merchant computing systems;

iterating a parsing operation over webpage code for the plurality of network traffic logs, wherein the parsing operation identifies webpage assets for webpages associated with the plurality of network traffic logs;

determining that one or more of the webpage assets meet or exceed a threshold occurrence in the plurality of network traffic logs based on the iterating;

determining that one of the webpage assets corresponds to a payment processing operation on one of the webpages based on one or more of the webpage assets being used for transaction events between the plurality of computing systems and the plurality of merchant computing systems, wherein the one of the webpage assets corresponds to a portion of the webpage code;

reporting the one of the webpage assets to a cataloging database associated with the transaction processor, wherein the one of the webpage assets being used by an additional website identifies that the additional website supports the payment processing operation;

detecting a navigation to the additional website by a device using a browser extension on the device;

scanning a network traffic log between the device and the additional website using the browser extension;

detecting the one of the webpage assets based on the network traffic log scanned, wherein the detecting includes identifying the portion of the webpage code on the additional website when scanning the network traffic log;

identifying that the payment processing operation appears on the additional website based on the detecting;

comparing a first usage of the payment processing operation for an item on one or more of the webpages with a second usage of the payment processing option for the item on the additional website, wherein the comparing is based on a payment instrument usable by the device for the first usage and the second usage of the transaction processing operation;

displaying, in real-time via the browser extension based on the navigation, an option associated with using the payment processing operation for a transaction on the additional website; and populating a field on the additional website with information associated with the payment instrument.

15. The method of claim 14, further comprising:

cataloging the webpage assets with the webpages in the cataloging database.

16. The method of claim 15, further comprising:

reporting the catalogued webpage assets to a plurality of website extensions executable by the plurality of computing systems.

17. The method of claim 14, further comprising:

adjusting the browser extension; and identifying, based on the adjusting, the one of the webpage assets on at least the one of the webpages.

18. The method of claim 17, further comprising:

causing to be populated, within an interface on one of the plurality of computing systems, a discount associated with the one of the webpage assets.

19. The method of claim 14, wherein the parsing operation comprises an operation to analyze hypertext markup language code, extensible markup language code, or cascading style sheets code for the webpage assets.

20. The method of claim 14, wherein the payment processing operation comprises one of a checkout operation, a payment card payment option, a bank account payment option, or a gift card payment option.

* * * * *